United States Patent [19]
Leibhard et al.

[11] Patent Number: 5,332,153
[45] Date of Patent: Jul. 26, 1994

[54] SLEEVE FOR INCREASING RETENTION VALUE OF A SCREW

[75] Inventors: Erich Leibhard, Munich; Franz Popp, Buchloe; Wolfgang Ludwig, Landsberg, all of Fed. Rep. of Germany; Thomas Schwaninger, Nenzing, Austria

[73] Assignee: Hilti Aktiengesellschaft, Fürstentum, Liechtenstein

[21] Appl. No.: 987,222

[22] Filed: Dec. 8, 1992

[30] Foreign Application Priority Data

Dec. 9, 1991 [DE] Fed. Rep. of Germany ....... 4140563
Sep. 12, 1992 [DE] Fed. Rep. of Germany ....... 4230428

[51] Int. Cl.⁵ .............................................. F16B 13/06
[52] U.S. Cl. ..................................... 238/373; 411/42; 411/55; 411/72; 411/178; 238/377
[58] Field of Search ............... 238/371, 372, 373, 374, 238/377; 411/15, 55, 42, 71, 72, 178

[56] References Cited

U.S. PATENT DOCUMENTS

| | | | |
|---|---|---|---|
| 730,585 | 6/1903 | Thiollier | 411/17 |
| 843,713 | 2/1907 | Stucki | 238/373 |
| 4,439,078 | 3/1984 | Dessouroux | 411/178 |
| 5,160,225 | 11/1992 | Chern | 411/178 X |

FOREIGN PATENT DOCUMENTS

| | | |
|---|---|---|
| 0188490 | 7/1986 | European Pat. Off. . |
| 597885 | 6/1934 | Fed. Rep. of Germany ...... 238/373 |
| 1784010 | 1/1973 | Fed. Rep. of Germany . |
| 2450473 | 5/1976 | Fed. Rep. of Germany ...... 238/373 |
| 967977 | 11/1950 | France ................................. 238/373 |
| 1189501 | 9/1960 | France ................................. 238/373 |
| 713175 | 9/1966 | Italy ..................................... 411/16 |
| 25430 | 1/1915 | Norway .............................. 238/373 |
| 273780 | 6/1927 | United Kingdom ................. 411/17 |

Primary Examiner—Michael S. Huppert
Assistant Examiner—Scott L. Lowe
Attorney, Agent, or Firm—Anderson Kill Olick & Oshinsky

[57] ABSTRACT

The retention value of a screw previously inserted into a wooden railroad tie is increased by an axially extending sleeve (20) having an external thread (24) and an internal thread (25). The thread revolutions of the internal thread (25) are offset axially by half (h) the thread pitch (H) of the external thread (24). Due to this offset of the threads, the screw is positioned in the sleeve so that its threads are located between the external thread revolutions affording a new retention, while the external thread (24) seats within the thread previously formed in the wooden railroad tie by the screw.

12 Claims, 2 Drawing Sheets

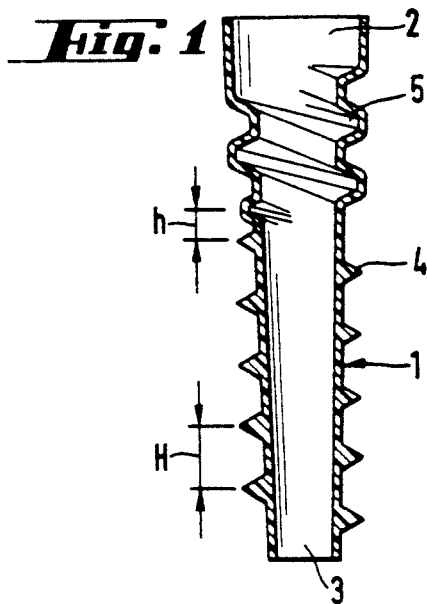
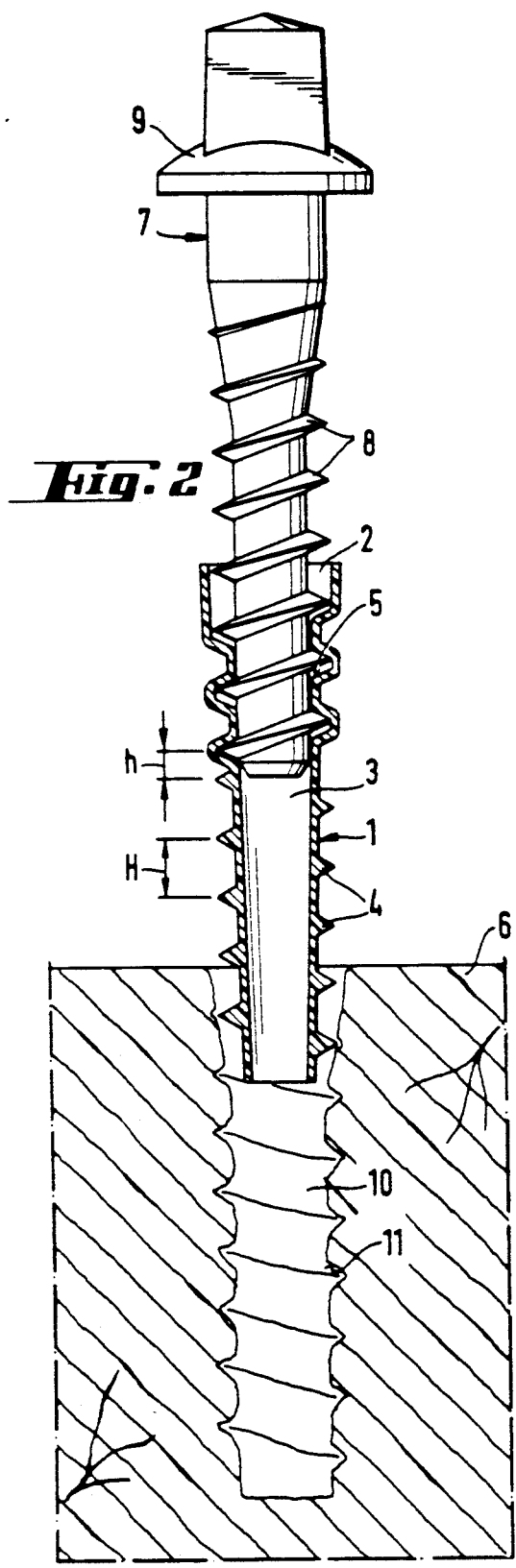
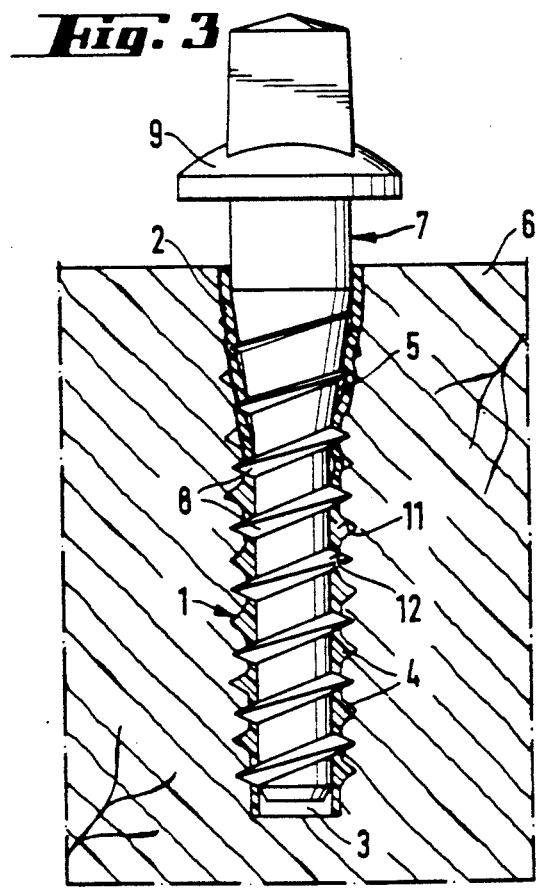

SLEEVE FOR INCREASING RETENTION VALUE OF A SCREW

BACKGROUND OF THE INVENTION

The present invention is directed to a sleeve for increasing the retention value of a screw in a structural component, particularly in a railroad tie. The sleeve has an external thread with a thread revolution and a constant external diameter on the outer surface of the sleeve and an internal bore which at the trailing end of the sleeve has a thread revolution of an internal thread with a pitch corresponding to the thread revolution of the external thread.

In the past and even at the present time railroad track is laid on wooden ties. The connection of the panels carrying or supporting the rails with the wooden ties are made with known screws equipped with a thread similar to a wood screw. The retaining values of such screws diminish with the passage of time, because of weathering, the aging of the wood and continuous dynamic loads. As a result, there is a lessening of the positive locking connection between the receiving material in the form of the wooden tie and the thread of the screw, with the development of a weak point caused by the destruction of the thread in the bore of the wooden tie by the screw thread.

To again provide adequate retention values, a rehabilitation of the connection region is indispensable. The rehabilitation of the receiving material could be effected by replacing the wooden tie, however, for economic reasons a rehabilitation of the bore in the wooden tie has been considered. Various methods having different disadvantages have been known for such rehabilitation of the bore, where it has been attempted to provide a sound undamaged thread in the wooden tie for the screw threads.

Apart from chemical rehabilitation methods, which have disadvantages due to the application technology, the use of metallic helixes has been widely accepted. Such a device, disclosed in EP 0 188 490 effects a lining of the ineffective internal thread within the bore of the wooden tie for providing the possibility of threading-in the screw to form a new internal thread in the undamaged receiving material between the revolutions of the helix. While the use of such a helix has a negative effect on material costs when viewed purely economically, another particular disadvantage is the cumbersome setting method. The setting method is performed so that in a first work step the screw has to be withdrawn, in an additional work step the helix has to be threaded into the existing internal thread in the bore using a separate tool and, only after the setting tool is withdrawn from the hole, can the screw be threaded-in as a final work step by cutting a new internal thread. Accordingly, a separate work step is needed for inserting the helix and, in addition, requires the use of a special setting tool.

A plastics material sleeve with an external thread is disclosed in DE 1 784 010, however, it is not intended for such rehabilitation purposes and is also used in concrete ties. This plastics material sleeve acts as a type of dowel and assures an adequate positive lock due to a special shaping of its exterior contour in cooperation with the wooden tie.

DETAILED DESCRIPTION OF THE INVENTION

Therefore, it is the primary object of the present invention to provide a rehabilitation element which can be manufactured at low cost and involves the use of a plastics material sleeve with an internal thread and an external thread.

In accordance with the present invention, the internal bore of the sleeve tapers inwardly from the trailing end to the leading end of the sleeve, that is, the leading end is the end first inserted into the tie. The thread revolutions of the internal thread as well as the thread revolutions of the external thread are disposed to be axially offset relative to one another by half the thread pitch.

The sleeve embodying the present invention as compared to known methods, creates a considerable simplification of the setting method. The setting method involves as a first step the removal of the screw which no longer has adequate retention values. The sleeve is partially placed on the leading end of the removed screw with the thread of the screw engaged in a thread revolution of the internal thread of the sleeve. The screw and sleeve thus form a unit inserted into the existing bore of the wooden tie, so that the sleeve has its external thread fitted into the existing but no longer functional internal thread of the bore. The insertion of the unit can be effected with a conventional tool, so that, contrary to the known method, the rpm used plays a subordinate role. Whenever a sufficiently high torque is achieved during the insertion of the screw-in sleeve, a relative rotation takes place between the sleeve and the screw with the result that the screw continues to turn with respect to the sleeve already fixed in the wooden tie and thus the screw is driven into the tie.

The axial offset of the thread revolution of the internal thread to the thread revolution of the external thread by approximately half a thread pitch results in that the screw is positioned with respect to the revolutions of the external thread at the sleeve. When threading the sleeve, the thread turns of the external thread settle in the existing but no longer functional threads of the wooden tie. The wall of the sleeve is pressed by the screw thread against a still functional part of the bore in the wooden railroad tie. Accordingly, high extraction values of the screw are again established.

Compared to the rehabilitation method using a helix, one work step can be eliminated when utilizing the sleeve of the present invention whereby the element which is to line the damaged bore in the tie, that is the sleeve, is threaded into the tie together with the screw, so that an additional work step is not involved. Thus, considerable advantages with regard to handling and time-saving are achieved by the present invention. There is another advantage in that two sleeves, one following the other, can be used within the same bore, if considerable damage has been caused to the bore in the wooden tie.

By using plastics material for the sleeve, there is the further advantage that contact corrosion is avoided.

To save material for cost reasons, the thread revolution of the internal thread is constituted by formed shapes in the sleeve wall. It is possible to keep the wall thickness of the sleeve constant at least in certain regions which apart from material savings has injection molding advantages.

Preferably, the internal thread extends for the full axial length of the internal bore. Because of application technology of a sleeve with a continuous internal thread, only a slight, practically negligible frictional resistance is developed when the screw is inserted into the sleeve.

In a preferred arrangement, the core diameter of the external thread tapers conically toward the leading end of the sleeve. Since the thread revolutions of the external thread serve as a lining for the no longer functional internal thread of the bore in the tie, an adequate quantity of material must be provided in the sleeve. For this reason, the thread revolution of the external thread is preferably molded as a solid profile at the sleeve wall. The conical taper of the core diameter toward the leading end of the sleeve entails, viewed in a relative manner, that the radially measured thread height increases toward the leading end, because the external diameter of the external thread remains the same, whereby correspondingly more material is available for the lining with increasing depth. The wall thickness between the external diameter of the internal thread and the core diameter of the external thread increases, since the internal thread has an external diameter which advantageously tapers in a conical manner in the leading end direction. As the screw is threaded-in, a radial extension pressure is generated as the threading-in depth increases.

The external diameter of the internal thread tapers in a conical manner corresponding with the core diameter of the external thread. With such an arrangement of the internal and external threads, a uniform wall thickness extending essentially along the entire axial length of the sleeve is achieved. Preferably, a cylindrical bore follows toward the leading end from the tapered internal bore. The cylindrical internal bore ensures an essentially constant material accumulation as well as a constant thread height.

In an advantageous embodiment, the wall of the sleeve has at least one cross-sectional weakening extending radially as well as at least along a part of the sleeve length. With such a cross-sectional weakening, it is possible to tear the sleeve open at least at one point when threading-in the screw, so that it can be radially widened without additional resistance. Accordingly, the sleeve is more easily deformable in the radial direction.

In a preferred embodiment, the cross-sectional weakening is formed by elongated holes and openings passing through the wall of the sleeve arranged one behind the other in the axial direction. The portion of the sleeve wall located in the axial direction between the elongated holes and the opening is kept so small, that the threading-in of the screw is assured, while when a screw has been completely threaded into the sleeve a complete separation occurs through the remaining sleeve wall. The elongated holes can narrow in the axial direction. Due to the narrowing of the holes, regions are formed which lead to a selected tearing of the remaining sleeve wall when high radial stress is developed in the sleeve wall. By arranging several axially spaced elongated holes and openings in tandem at the circumference of the sleeve, the sleeve is torn into individual sections at least in the setting direction when the screw is threaded into the sleeve. Preferably, the sleeve has elongated holes provided at least along the axially enclosed regions between two adjoining thread flanks. Since the external thread is offset with respect to the internal thread by half a pitch, there necessarily results a larger cross-sectional area in that region where two adjoining thread flanks of the external thread are disposed opposite two adjoining thread flanks of the internal thread. Since this region requires greater forces acting in the radial direction to tear the sleeve into individual sections, the elongated holes are advantageously located in this region.

A catch or stop is preferably arranged in the trailing end-leading end direction after the first revolution of the internal thread adjacent the trailing end, so that, after a preset torque is reached, the stop can be overcome by the screw. To permit the sleeve to be threaded into the bore in a wooden railroad tie with the help of the screw, the trailing end of the sleeve is formed with a circumferential neck portion with an interior diameter corresponding to the largest diameter of the revolutions of the internal thread. This neck portion forms a guidance region, for ease in the assembly of the unit consisting of the sleeve and the screw and such assembly does not require a laborious search for the start of the thread revolution of the internal thread. The arrangement of the unit also provides an advantage in that operating personnel wearing gloves in very cold weather can assembly the sleeve and screw in a simple manner to form a single unit.

It is possible to transfer torque through the screw to the sleeve by means of the catch or stop located between the so-called neck portion and the thread revolution of the internal thread. The catch can be designed in many ways. It is possible to provide protrusions or projections reducing the internal cross-section of the sleeve projecting radially into the sleeve from the internal wall of the sleeve. It is also possible to arrange the thread turns of the internal thread to extend over a section of approximately two revolutions followed by a smooth internal bore.

If the sleeve is not threaded into the tie for a satisfactory depth, because of very high friction between the sleeve and the tie, with a portion of the sleeve projecting out of the tie, this is not disadvantageous, since the sleeve wall can easily be deformed or broken off by the plate on the tie or the head of the screw.

The catch or stop is appropriately formed as a region of the internal thread tapering conically toward the leading end. Especially in sleeves having a continuous internal thread, the catch can be shaped as a conical taper in a region adjacent the trailing end. Accordingly, the sleeve can be brought into connection with the screw, so that the sleeve along with the screw forms a single unit.

The thread profile of the external thread on the sleeve has a V-shaped configuration. Because of this configuration, the sleeve can be threaded into the bore in the wooden tie with a relatively low torque. With such low torque, the sleeve is inserted as deeply as possible into the tie by the torque applied to the screw. Moreover, such a thread profile creates a sufficient lining of the no-longer functional internal thread in the tie bore, since the screws utilized have an approximately similar profile.

The various features of novelty which characterize the invention are pointed out with particularity in the claims annexed to and forming a part of this disclosure. For a better understanding of the invention, its operating advantages and specific objects attained by its use, reference should be had to the drawing and descriptive matter in which there is illustrated and described a preferred embodiment of the invention.

BRIEF DESCRIPTION OF THE DRAWING

In the drawing:

FIG. 1 is an axially extending sectional view of a sleeve embodying the present invention;

FIG. 2 shows the sleeve of FIG. 1 connected with a screw before it is threaded into a bore in a wooden tie;

FIG. 3 is a view similar to FIG. 2 after the sleeve and screw have been completely inserted into the bore of the wooden tie;

DETAILED DESCRIPTION OF THE INVENTION

Figures 4, 5:
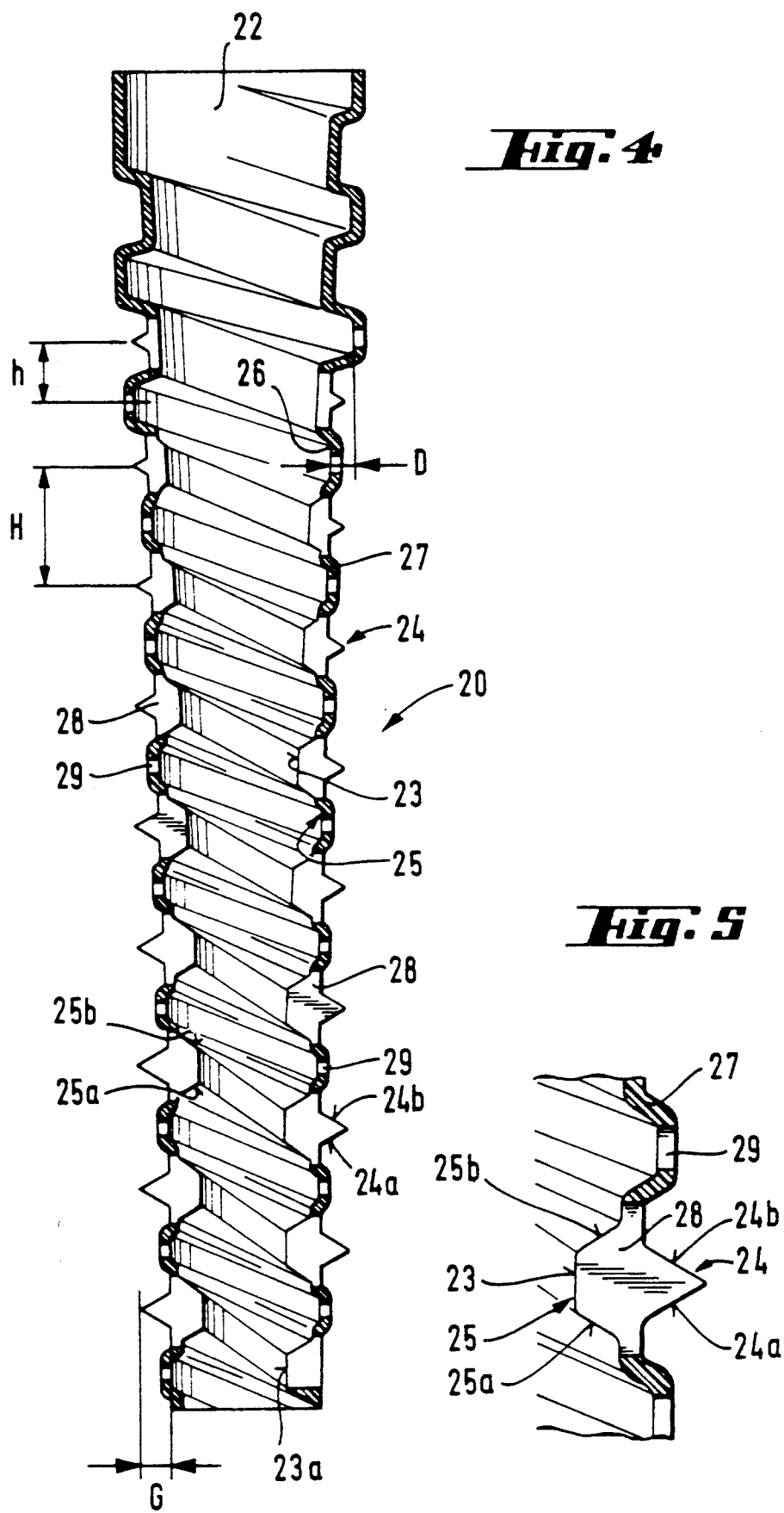
FIG. 4 is another sleeve shown in axial section embodying the present invention and having a continuous internal thread.
FIG. 5 is an enlarged portion of the sleeve shown in FIG. 4.

In FIG. 1 an axially extending sleeve 1 is shown in section with a tapering internal bore 3. The sleeve has a leading end at its lower end and a trailing end at its upper end as viewed in FIG. 1. The bore 3 tapers inwardly from the trailing end to the leading end. The sleeve 1 has revolutions of an external thread 4 on its outer surface with the external diameter of the external thread 4 remaining constant. The external thread 4 has a V-shaped cross-section forming a sharp tip. The internal bore 3 has thread revolutions of an internal thread 5 commencing at the trailing end. This internal thread 5 extends for approximately two revolutions and has a pitch identical to the pitch of the external thread. The internal thread 5 is not a continuation of the external thread 4, rather it is offset by half h the thread pitch H so that in the axial direction there is a spacing between the revolutions of the internal thread 5 and the revolutions of the external thread 4. Note in FIG. 1 that the external thread 4 commences in a region spaced axially from the trailing end of the sleeve.

As shown in FIG. 1, the internal thread 5 is formed by an outward deformation of the sleeve wall with the result that a thread is formed on the outer surface of the sleeve, however, this thread is of no significance to the function of the unit formed by the sleeve and screw. The internal thread runs from the trailing end toward the leading end and commences in a circumferentially extending neck portion 2 at the trailing end, with the neck portion having an internal diameter corresponding to the largest diameter of the internal thread.

In FIGS. 2 and 3 a screw 7 and a wooden railroad tie 6 are displayed in addition to the sleeve 1. Screw 7 has an axially extending thread 8 and a head 9 at its trailing end.

In FIG. 2, the sleeve 1 and the screw 7 are combined into a single unit with the thread 8 of the screw 7 engaged into the internal thread 5 of the sleeve 1. In this assembled condition, the unit can be threaded into the wooden railroad tie 6 using a known tool.

It is also shown in FIG. 2 that the wooden tie 6 has a bore 10 with an existing internal thread 11. Internal thread 11 was originally formed by the screw 7.

Inserting the unit formed of sleeve 1 and screw 7 requires that the external thread 4 seeks out the internal thread 11 so that at the end of the insertion step external thread 4 is engaged in the revolutions of internal threads 11, as shown in FIG. 3. After driving the sleeve 1 for a sufficient distance into the bore 10, that is, when the frictional value between the sleeve 1 and the wall of the bore 10 reaches a specific magnitude, a relative rotation between the screw 7 and the sleeve 1 takes place, whereby the screw 7 is threaded into the sleeve 1. Prior to turning the screw 7 into the sleeve 1, screw thread 8 is repositioned by the internal thread 5, so that thread 8 is located between the thread revolutions of the external thread 4 on the sleeve 1. As a result, for this selected configuration of sleeve 1, the sleeve is cut open between the thread revolutions of the external thread 4 as the screw 7 is moved into the sleeve 1, whereby thread 8 of the screw 7 taps a new thread 12 in the bore 10 as can be seen in FIG. 3.

FIG. 4 displays another sleeve 20 in axial section with an internal bore 23 tapering inwardly from the trailing end towards the leading end of the sleeve. An internal thread 25 extends through the internal bore 23 between the trailing and leading ends. The sleeve 20 has an external thread 24 on its outer surface and the external diameter of this thread is constant. The core diameter of the external thread 24 tapers conically inwardly from the trailing end to the leading end. The profile of the external thread 24 has a V-shaped cross-section providing a sharp edged thread. In the trailing end region of sleeve 20, the internal bore 23 has a catch or stop 26. The catch 26 is formed by a diameter change D of two different external diameters of the internal thread 25. Catch 26 serves for receiving a screw, not shown, by means of which a torque is transmitted to the sleeve 20. After the sleeve 20 has been completely inserted into the original thread of a wooden tie, not shown, the torque rises and the catch is overcome by the screw and further threading of the screw into the sleeve 20 can take place.

Internal thread 25 has the same thread pitch H as external thread 24. The thread revolutions of the internal thread 25 are axially offset by half a thread pitch h from the thread turn of the external thread 24. The thread pitch of the external thread is designated as H.

As shown in FIG. 4, the internal thread 25 is formed by an outward deformation of the sleeve wall 27 with the result that a sort of external thread is formed in the outer surface of the sleeve wall, however, such thread has no significance with regard to the function of the unit.

Sleeve 20 has a cylindrical internal bore 23a in the leading end region. Apart from the cylindrical internal bore 23a, the internal thread with the appropriate core diameter as well as the external thread 24 with the appropriate core diameter extend cylindrically. This design of the sleeve 20 results in a constant wall thickness and a constant sleeve wall 27 in the region of the leading end. Accordingly, an anchoring region is created which experiences the same radial gripping or retention across a given axial length during the threading-in of a not-shown screw.

As displayed in FIGS. 4 and 5, the sleeve 20 has openings extending in the radial direction and configured as elongated holes 28 or openings 29. The openings 29 and the elongated holes 28 are specifically located in the region of the flanks 25a, 25b of the internal thread 25 and in the region of the flanks 24a, 24b of the external thread 24 and assure the tearing of the sleeve 20 into individual sections, not shown. The elongated holes 28 narrow in the axial direction toward both ends of the sleeves. Accordingly, rated breakpoints are created which lead to the tearing of the remaining sleeve wall 27 between the elongated holes 28 and the openings 29 as the screw is threaded in.

The elongated holes 28 and the openings 29 are arranged one after the other in the axial direction of the sleeve. By arranging several consecutive openings at the circumference of the sleeve 20, the number of sections can be determined to which the sleeve 20 is at least partially torn, when the screw is threaded into the sleeve 20.

The external diameter of the internal thread 25 tapers conically from the trailing end to the leading end to correspond with the core diameter of the external thread 24. As a result, there is an increase in the thread height G toward the leading end of the sleeve.

While a specific embodiment of the invention has been shown and described in detail to illustrate the application of the inventive principles, it will be understood that the invention may be embodied otherwise without departing from such principles.

We claim:

1. Sleeve for increasing the retention value of a screw (7) in a structural component, said sleeve being axially elongated and having a leading end to be inserted first into a bore and a trailing end, said sleeve having an exterior surface and an interior surface, said exterior surface having a radially outwardly extending external thread (4, 24) terminating in a radially outer tip of constant external diameter with a thread pitch (H), said interior surface forming an axially extending internal bore (3, 23) including an internal thread (5, 25) at least in an axially extending section adjacent the trailing end of the sleeve, said internal thread having a thread pitch (H) the same as the thread pitch (H) of the external thread, wherein the improvement comprises that said internal bore (3, 23) tapers inwardly from the trailing end toward the leading end and in the trailing end-leading end direction said external thread (4, 24) follows said internal thread (5, 25) and said external thread (4, 24) and internal thread (5, 25) are offset in the trailing end-leading end direction by half (h) the thread pitch (H).

2. Sleeve, as set forth in claim 1, wherein the internal thread (25) extends for the full axial length of said internal bore (23).

3. Sleeve, as set forth in claim 1 or 2, wherein said external thread (4, 24) extends from a core at the exterior surface of said sleeve to said tip and said core having a core diameter tapering conically inwardly from the trailing end to the leading end of said sleeve.

4. Sleeve, as set forth in claim 3, wherein said internal thread (5, 25) has an external diameter spaced radially outwardly from the interior surface of said sleeve and tapering conically inwardly from the trailing end to the leading end of said sleeve.

5. Sleeve, as set forth in claim 4, wherein the external diameter of the internal thread (5, 25) tapers correspondingly with the core diameter of said external thread (4, 24).

6. Sleeve, as set forth in claim 1 or 2, wherein a cylindrical internal bore section (23a) extends from the leading end of said sleeve to the tapered internal bore (23).

7. Sleeve, as set forth in claim 6, wherein said internal thread (25) has an external diameter spaced radially outwardly from the interior surface of said sleeve and said external thread (24) extends from a core at the exterior surface of said sleeve to said tip and said core having a core diameter and said external diameter of the internal thread and said core diameter of the external thread are cylindrical in the region of the cylindrical internal bore section (23a).

8. Sleeve, as set forth in claim 7, wherein said sleeve (20) has a wall (27) extending from the trailing end to the leading end and said wall has at least one cross-sectional weakened section extending in the axial direction at least along a portion of the length thereof.

9. Sleeve, as set forth in claim 8, wherein said cross-sectional weakened section comprises elongated holes (28) and openings (29) extending through said sleeve wall (27) and arranged following one another in the axial direction of the sleeve.

10. Sleeve, as set forth in claim 9, wherein said external thread (24) has thread flanks (24a, 24b) and said elongated holes (28) are located in an axially extending region between adjoining and facing flanks of said thread flanks (24a, 24b).

11. Sleeve, as set forth in claim 10, wherein a catch (26) is located in the trailing end-leading end direction in a thread revolution of internal thread (25) and spaced from the trailing end, said catch (26) is arranged to stop progress of the screw along the internal thread, but to be overcome by the screw after the screw attains a predetermined torque.

12. Sleeve, as set forth in claim 11, wherein said catch (26) is located in a region of said internal thread (25) tapering conically inwardly towards said leading end.

* * * * *